(12) United States Patent
Komatsubara et al.

(10) Patent No.: US 11,364,799 B2
(45) Date of Patent: Jun. 21, 2022

(54) TORQUE CONTROL DEVICE FOR FOUR-WHEEL-DRIVE VEHICLE

(71) Applicant: HONDA MOTOR CO., LTD., Tokyo (JP)

(72) Inventors: Masaru Komatsubara, Wako (JP); Masatoshi Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 448 days.

(21) Appl. No.: 16/468,102

(22) PCT Filed: Dec. 4, 2017

(86) PCT No.: PCT/JP2017/043484
§ 371 (c)(1),
(2) Date: Jun. 10, 2019

(87) PCT Pub. No.: WO2018/110347
PCT Pub. Date: Jun. 21, 2018

(65) Prior Publication Data
US 2019/0299779 A1    Oct. 3, 2019

(30) Foreign Application Priority Data

Dec. 13, 2016    (JP) .............................. JP2016-241698

(51) Int. Cl.
*B60K 23/08*    (2006.01)
*B60K 17/346*    (2006.01)
*B60K 17/344*    (2006.01)

(52) U.S. Cl.
CPC ........ *B60K 23/0808* (2013.01); *B60K 17/344* (2013.01); *B60K 17/3462* (2013.01); *B60K 2023/0816* (2013.01)

(58) Field of Classification Search
CPC .............. B60K 23/0808; B60K 17/344; B60K 17/3462; B60K 2023/0816;
(Continued)

(56) References Cited

U.S. PATENT DOCUMENTS 4,986,388 A    1/1991    Matsuda
5,247,443 A *  9/1993    Gilliam .............. B60K 23/0808
                                                        180/249
(Continued)

FOREIGN PATENT DOCUMENTS

CN          101362437 A      2/2009
EP             1480031 A2 * 11/2004    .............. B60T 8/172
(Continued)

OTHER PUBLICATIONS

International Search Report dated Jan. 16, 2018, issued in counterpart International Application No. PCT/JP2017/043484 (1 page).
(Continued)

*Primary Examiner* — Justin Holmes
(74) *Attorney, Agent, or Firm* — WHDA, LLP (57) ABSTRACT

Provided is a torque control device for a four-wheel-drive vehicle that can stably output a minimum torque required to start or drive the vehicle to the auxiliary wheel side under a road surface condition that main driving wheels are stuck in the idling state or under a road surface condition equivalent thereto. When front wheels Wf1, Wf2 are judged to be stuck in the idling state, a current rear torque TrCMD is raised step by step. And, when a brake operates in the state in which the four wheels are at stop after raising the command torque TrCMD step by step, the command rear torque TrCMD is released. And, the command rear torque TrCMD is raised step by step when the command rear torque TrCMD continues to be released for a second threshold time.

9 Claims, 8 Drawing Sheets

(58) Field of Classification Search
CPC .... B60K 2023/0833; B60K 2023/0866; B60K 17/35; B60K 23/08; B60K 5/04; B60Y 2400/424
See application file for complete search history.

(56) References Cited

U.S. PATENT DOCUMENTS

| | | | |
|---|---|---|---|
| 5,270,930 A | 12/1993 | Ito et al. | |
| 5,704,444 A * | 1/1998 | Showalter | F16D 27/115 180/247 |
| 5,752,211 A * | 5/1998 | Takasaki | B60K 23/0808 180/197 |
| 2003/0098193 A1 * | 5/2003 | Ohtsu | B60K 23/0808 180/197 |
| 2009/0043469 A1 | 2/2009 | Fukuda et al. | |

FOREIGN PATENT DOCUMENTS

| | | | |
|---|---|---|---|
| JP | 2-270640 A | 11/1990 | |
| JP | 4-201729 A | 7/1992 | |
| JP | H04-201729 A | 7/1992 | |
| JP | 2009-40151 A | 2/2009 | |
| JP | 2013-67326 A | 4/2013 | |
| WO | WO-03091058 A1 * | 11/2003 | ......... B60K 23/0808 |

OTHER PUBLICATIONS

Office Action dated May 26, 2020, issued in counterpart JP Application No. 2018-556588, with English Translation. (6 pages).
Office Action dated Sep. 26, 2021, issued in counterpart CN application No. 201780073777.2, with English translation. (17 pages).
Office Action dated Apr. 14, 2022, issued in counterpart CN application No. 201780073777.2, with English translation. (16 pages).

* cited by examiner

TORQUE CONTROL DEVICE FOR FOUR-WHEEL-DRIVE VEHICLE

TECHNICAL FIELD

The present invention relates to a torque control device for a four-wheel-drive vehicle including main driving wheels and auxiliary driving wheels to which a drive force from a driving source is transmitted. The torque control device controls a distributed drive torque distributed to the auxiliary driving wheels by controlling a torque distribution clutch provided between the drive source and the auxiliary driving wheels.

BACKGROUND ART

Conventionally, a hydraulic electronic control four-wheel-drive system is known as so-called a real-time type four-wheel-drive system that alternately switches between a two-wheel-drive (2WD) state and a four-wheel-drive (4WD) state depending on a road surface condition. This hydraulic electronic control four-wheel-drive system is configured to electronically control a hydraulic pressure for engaging a clutch (namely, clutch engagement pressure) using an electric oil pump and a solenoid valve (namely, hydraulic control valve). This clutch is a hydraulic multi-disc type, which is arranged inside of a rear differential mechanism, for connecting/disconnecting a propeller shaft for transmitting a drive torque from an engine to the rear wheel side. For example, refer to Patent Document 1.

In the above-described four-wheel-drive system, on one hand, when the hydraulic multi-disc type clutch is disengaged (namely, disconnected), no rotation of the propeller shaft is transmitted to the rear wheel side. Consequently, a whole torque of the engine is transmitted to the front wheels, thereby establishing the front-wheel drive (2WD). On the other hand, when the hydraulic multi-disc type clutch is connected, a rotation of the propeller shaft is transmitted to the rear wheel side. Consequently, the torque of the engine is distributed to both the front wheels and the rear wheels, thereby establishing the four-wheel drive (4WD). Further, the rear torque distribution transmitted to the rear wheel side can be changed by changing the clutch engagement pressure.

Figure 7:
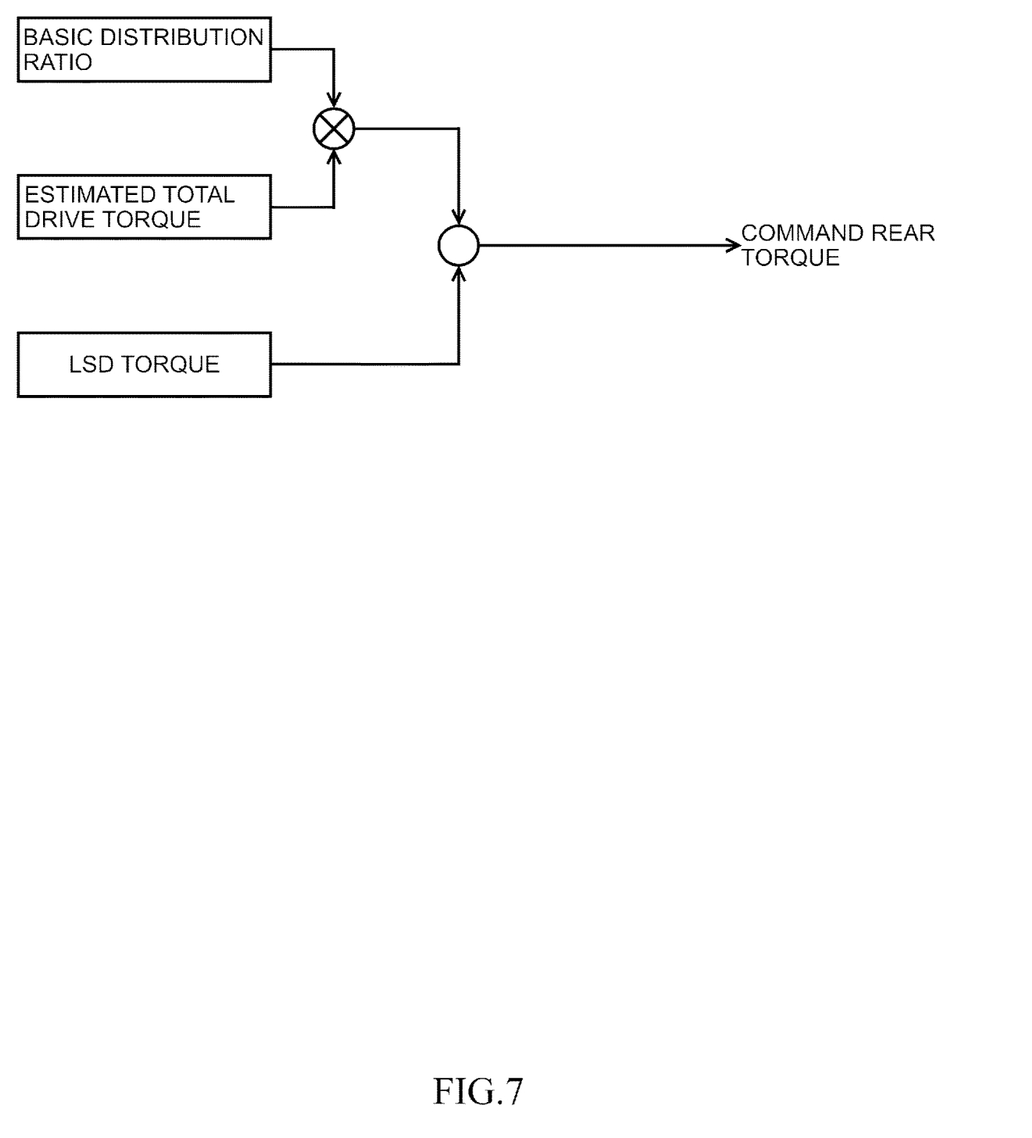
FIG. 7 is a block diagram illustrating a control structure of a control unit with respect to a rear torque command for a conventional clutch.

A rear torque command with respect to the rear torque distribution of the above-described four-wheel-drive system is performed by a control unit (ECU) having a torque distribution control structure shown in FIG. 7. The control unit: first, 1) calculates an estimated total drive torque necessary for the four wheels on the basis of a user operation such as an accelerator pedal opening of the engine, and then multiplies the calculated estimated total drive torque by a basic distribution ratio so as to calculate a basic distribution torque to be transmitted to the rear wheels; next 2) detects a differential rotation (namely, clutch differential rotation) between the front wheels and the rear wheels so as to calculate a differential limit torque (namely, LSD torque) for limiting a differential between the front wheels and the rear wheels; and 3) outputs a value obtained by adding the basic distribution torque to the LSD torque as a command rear torque. That is to say, the command rear torque is determined by the basic distribution torque calculated based on the estimated total drive torque and the LSD torque.

RELATED ART DOCUMENTS

Patent Documents

[Patent Document 1] Japanese Unexamined Patent Application Publication No. 2013-67326.

DISCLOSURE OF THE INVENTION

Problems to be Solved by the Invention

FIG. 8 is a time chart showing time-series variations of a command rear torque with respect to the above-described control unit under a road surface condition that the front wheels are in the idling (as if a free roller) state (namely, no-load idling state). The horizontal axis indicates a common time base, and the vertical axes respectively indicate an accelerator pedal opening, an estimated total drive torque, a rotation speed of each wheel, a command rear torque and an LSD torque.

Figure 8A:
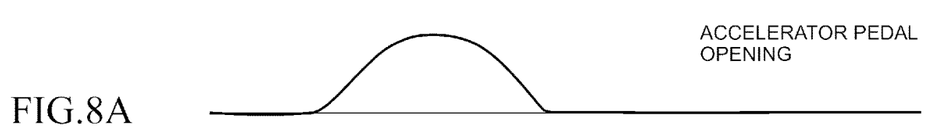
FIGS. 8A to 8D depict a time chart illustrating temporal changes in a command rear torque with respect to the above-mentioned conventional control unit under a road surface condition that a vehicle is stuck with front wheels being in an idling state.
Figure 8B:
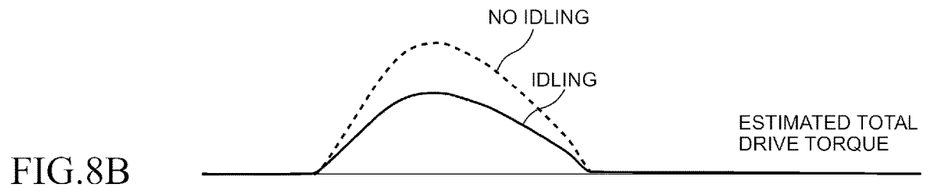

First, as a problem on the control side, as shown in FIGS. 8A and 8B, the estimated total drive torque rises gently depending on an accelerator pedal opening (namely, engine torque curve). As a result, the command rear torque rises late (namely, the response worsens), thus making it impossible to transmit the drive torque instantly to the rear wheels.

In addition, as illustrated by the dotted line (namely, no front wheel idling) and the actual line (namely, front wheel idling) in FIG. 8B, the estimated total drive torque when the front wheels are idling with respect to the same accelerator pedal opening AP is estimated lower compared to the estimated total drive torque when no front wheels are idling similar to the case of running on a flat road surface in a good condition. In other words, when the front wheels are idling, the estimation accuracy as to the drive torque to be distributed to the rear wheels deteriorates. This is because when the front wheels are idling, the engine and a torque converter are in the no-load rotation state, allowing the engine/torque converter protection control to intervene.

Figure 8C:
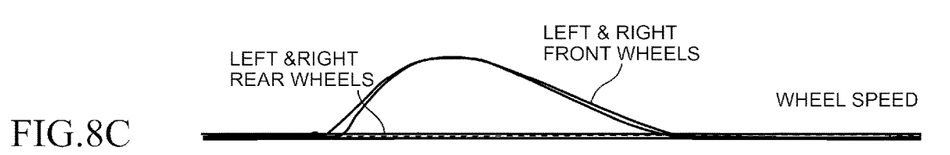
Figure 8D:
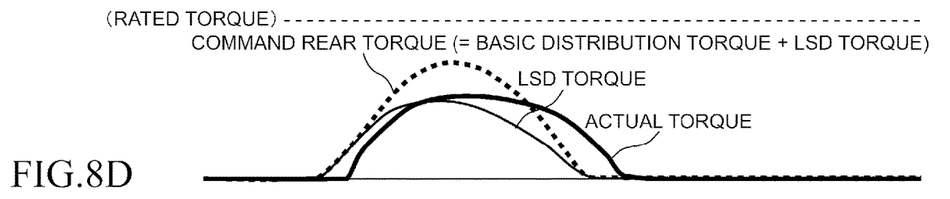

Furthermore, as illustrated in FIGS. 8C and 8D, the LSD torque is added to the basic distribution torque after a differential rotation is detected between the front wheels and the rear wheels. That is to say, the LSD torque is determined after a clutch differential rotation occurs. As a result, the command rear torque rises late (namely, the response worsens), making it impossible to instantly transmit the drive torque to the rear wheels.

On the other hand, there is a problem on the mechanism side. As the LSD torque is transmitted to the rear differential gear side in the process of engaging the clutch after inputting a clutch differential rotation, a lower torque value is output necessarily to the rear differential gear side due to the efficiency at the time of pressing, compared to a so-called stand-by torque transmitted to the rear differential gear side in the process of inputting the clutch differential rotation after the clutch engagement.

In addition, an output of the torque transmitted to the rear differential gear side (namely, a transmission torque capacity of the clutch) decreases over time due to heat generation of the clutch. Therefore, as shown in FIG. 8D, the above-described problems on the control side and the mechanism side might cause the command rear torque itself to fall below a minimum rated torque required to start the vehicle without reaching the rated torque. In this case, the above-described four-wheel-drive system can output no actual torque higher than or equivalent to the rated torque to the rear wheels, and accordingly fails to satisfy the running performance of the vehicle.

The present invention was made in view of above-mentioned point, and the purpose is to provide the torque control device for the four-wheel-drive vehicle that can stably output a minimum torque required for the start or running of the vehicle to the auxiliary driving wheel side under the road surface condition that the main driving wheels are in the idling state.

Means of Solving the Problems

In order to achieve the above objects, a torque control device for a four-wheel-drive vehicle according to the present invention includes main driving wheels (Wf1, Wf2) to which a drive torque from a drive source (3) of the vehicle is always transmitted, auxiliary driving wheels (Wr1, Wr2) to which the drive torque is transmitted as needed, a drive torque transmission path (20) for transmitting the drive torque to the auxiliary driving wheels, a clutch (10) for connecting/disconnecting the drive torque transmission path, and a control means (50) for controlling a distribution drive torque distributed to the auxiliary driving wheels by controlling the clutch. The control means (50) includes a command torque output section (50A) for outputting a command distribution drive torque (TrCMD) that is a command value of the distribution drive torque. If a differential rotation ($\Delta N$) of the clutch (10) continues for a predetermined first time (T1), the control means (50) characteristically performs control to raise a current command distribution drive torque for the clutch (10).

In the above-described configuration, upon judgement that the main driving wheels are idling after the first time has passed in the state in which a differential rotation has occurred to the clutch, the current command distribution drive torque for the clutch is raised. This enables the command distribution drive torque to rise fast, whereby the time required to output an actual drive torque is greatly shortened. Further, because of the rise in the command distribution drive torque, no command distribution drive torque is output low. As a result, in the so-called LSD torque state in which the clutch is engaged after inputting the clutch differential rotation, the actual torque higher than or equivalent to the rated torque can be easily transmitted to the auxiliary driving wheel side. Therefore, a minimum torque necessary for the start or running of the vehicle under the road surface condition that the main driving wheel are idling can be stably output to the auxiliary driving wheel side, thus enabling the vehicle to escape from the idling state of the main driving wheels earlier.

In this case, when the differential rotation of the clutch continues for the first time in the state in which the auxiliary driving wheels are at stop, the control means may immediately raise the above-described current command distribution drive torque step by step.

According to this configuration, the vehicle is judged to be in a stuck state (namely, halting state) with the main driving wheels being idling after the differential rotation of the clutch has continued for the first time in the state in which the auxiliary driving wheels are at stop. And in this case, a quick transmission of an excessive torque (namely, a maximum torque or a nearly maximum torque) to the auxiliary driving wheels allows the vehicle to return early and securely from the stuck state. In this manner, the vehicle can quickly escape from the stuck state prior to any influences such as heating of the clutch.

Alternatively, after the differential rotation of the clutch has continued for the first time in the state in which no auxiliary driving wheels are at stop, the above-described control means may raise the command distribution drive torque gradually according to elapsed time. In this case, moreover, the above-described control means may raise the command distribution drive torque so as to be proportional to the elapsed time after the differential rotation of the clutch has continued for the first time.

According to this configuration, the main driving wheels are judged to be idling while the vehicle is running (particularly, at a low speed) after the differential rotation of the clutch has continued for the first time in the state in which no auxiliary driving wheels are at stop. And in this case, by gradually (namely, step by step) transmitting a non-excessive torque (namely, relatively small torque) to the auxiliary driving wheels, the clutch is smoothly engaged so as to dissolve the idling state of the main driving wheels. This enables the main driving wheels to return from the idling state without no unstable behavior of the running vehicle.

In other words, if an excessive torque, namely, a maximum or nearly maximum torque is suddenly transmitted to the auxiliary driving wheels when the main driving wheels are idling in the state in which the vehicle is running, for example, on a snow-covered uphill road at a low speed, the vehicle might behave unstably. Because of this, in that case, a gradual increase in the torque transmitted to the auxiliary driving wheels can secure the stability of behaviors of the vehicle.

Furthermore, in the torque control device for the four-wheel-drive vehicle, the control means may perform control to release the command distribution drive torque when a brake for braking rotations of the main driving wheels and the auxiliary driving wheels operates and the main driving wheels and the auxiliary driving wheels stop after raising the command distribution drive torque step by step.

In the above-described configuration, by releasing the command distribution drive torque when the brake operates and the main driving wheels and the auxiliary driving wheels stop after the command distribution drive torque is raised step by step, the clutch can be completely disconnected once. As this can eliminate a differential rotation input in the clutch, a subsequent clutch engagement enables formation of so-called a stand-by torque state in which a torque is input after engaging the clutch (namely, a differential rotation between the front and rear wheels is input).

Moreover, in the above-described torque control device for the four-wheel-drive vehicle, the control means (50) may perform the control to raise the command distribution drive torque (TrCMD) step by step when a predetermined second time (T2) has passed after releasing the command distribution drive torque (TrCMD).

In the above-described configuration, by releasing the clutch for the prescribed time (namely, second time), the clutch is engaged in the state in which no clutch differential rotation occurs, thereby forming the stand-by torque state to the clutch. As a result, the actual drive torque transmitted to the auxiliary driving wheels via the clutch suitably follows the command distribution drive torque. In this manner, the actual drive torque higher than or equivalent to the rated torque can be transmitted to the auxiliary driving wheels.

Effects of the Invention

According to the present invention, in the torque control device for the four-wheel-drive vehicle that changes the distribution drive torque distributed to the auxiliary driving wheels from the drive source of the vehicle, the actual drive torque higher than or equivalent to the minimum rated torque necessary for the start or running of the vehicle can be transmitted to the auxiliary driving wheels in the case that the main driving wheels are judged to be in the idling state. This can improve the running stability necessary for the vehicle under the road surface condition that the main driving wheels are in the idling state.

MODE FOR CARRYING OUT THE INVENTION

Hereinafter, an embodiment of the present invention will be described in detail with reference to the accompanying drawings.

First Embodiment

Figure 1:
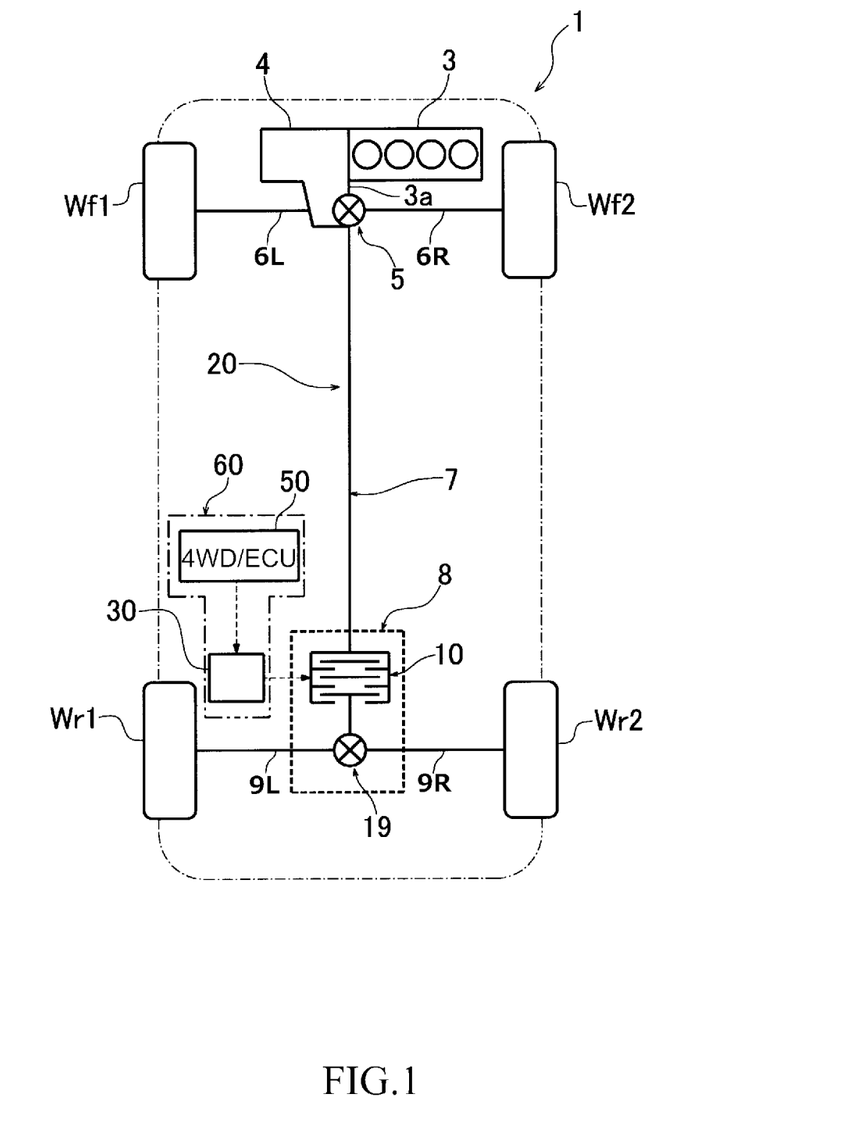
FIG. 1 is a view illustrating a schematic configuration of a four-wheel drive vehicle including a driving force distributor according to one embodiment of the present invention.

FIG. 1 is a diagram illustrating a schematic configuration of a four-wheel-drive vehicle equipped with a torque control device in accordance with an embodiment of the present invention. The four-wheel-drive vehicle 1 shown in the same figure includes an engine (namely, drive source) 3, an automatic transmission 4 and a drive torque transmission path 20. The engine 3 is transversely mounted on the front part of the vehicle. The automatic transmission 4 is disposed integrally with the engine 3. The driving force transmission path 20 transmits a drive torque from the engine 3 to front left and right wheels Wf, Wf (hereinafter referred to as "front wheels") and rear left and right wheels Wr, Wr (hereinafter referred to as "rear wheels").

An output shaft (not shown in the figure) of the engine 3 is connected to the left and right front wheels W1, W2, which are main driving wheels, via the automatic transmission 4, a front differential (hereinafter referred to as "front diff") 5, and left and right front drive shafts 6L, 6R. Furthermore, the output shaft of the engine 3 is connected to the right and left rear wheels Wr, Wr, which are auxiliary driving wheels, via the automatic transmission 4, the front diff 5, a propeller shaft 7, a rear differential unit (hereinafter referred to as "rear diff unit") 8 and right and left rear drive shafts 9L, 9R.

The rear diff unit 8 is provided with a rear differential (hereinafter referred to as "rear diff") 19 for distributing a drive torque to the left and right rear drive shafts 9L, 9R and a front and rear torque distribution clutch 10 for connecting and disconnecting the torque transmission path from the propeller shaft 7 to the rear diff 19. The front and rear torque distribution clutch 10 is an actuator composed of a hydraulic clutch for controlling the drive torque distributed to the rear wheels Wr1, Wr2 in the driving force transmission path 20. The front and rear torque distribution clutch 10 also includes a hydraulic circuit 30 for supplying hydraulic fluid to the front and rear torque distribution clutch 10 and a 4WD-ECU 50 (hereinafter referred to as "control unit") that is a control means for controlling a hydraulic pressure supplied from the hydraulic circuit 30. The control unit 50 includes a microcomputer and other devices. The above-described control unit 50 and the above-described hydraulic circuit 30 constitute a hydraulic control device 60 (namely, torque control device). The hydraulic control device 60 and the front and rear torque distribution clutch 10 constitute a drive torque distributor 70.

Figure 2:
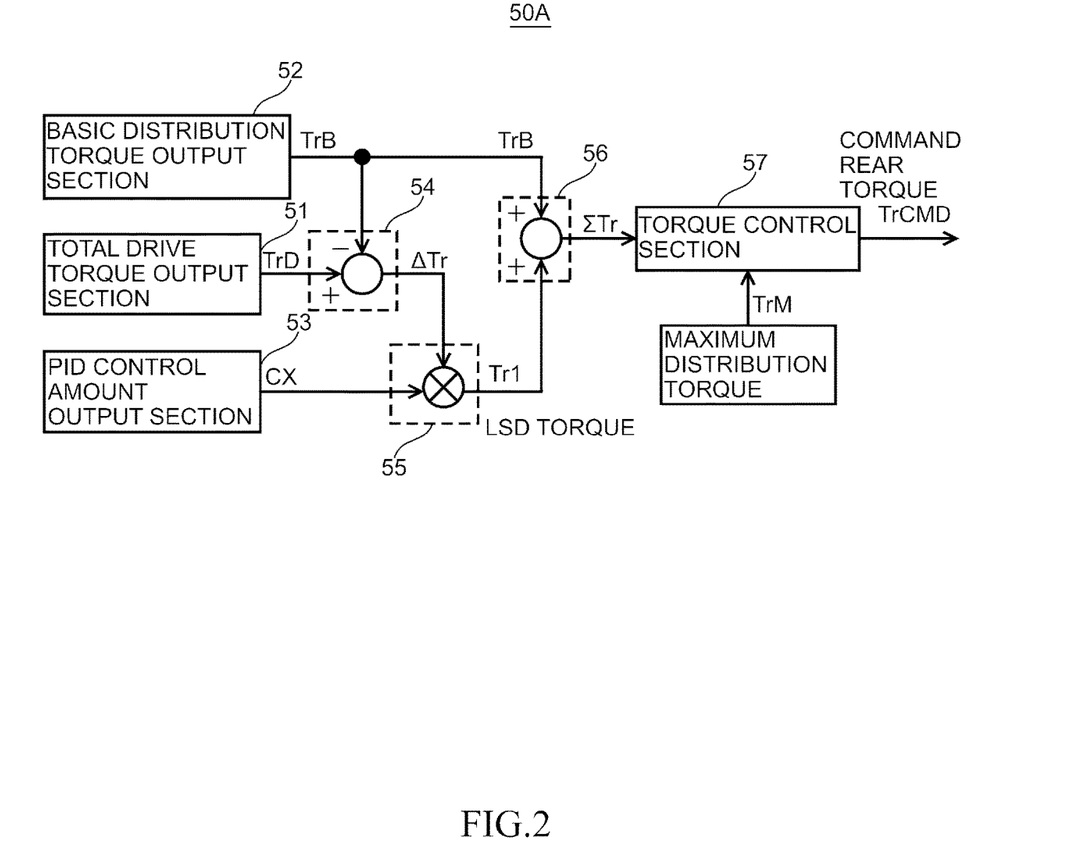
FIG. 2 is a view of a block diagram illustrating a command rear torque output section of a control unit with respect to a rear torque command for a clutch.

FIG. 2 is a block diagram illustrating a command rear torque output section 50A of the control unit 50 with respect to a rear torque command for the clutch 10. It should be noted that a hydraulic pressure for clutch engagement and a torque for clutch engagement correspond to each other. Hereinafter, therefore, the hydraulic pressure for clutch engagement is synonymous with the torque for clutch engagement.

The command rear torque output section 50A of the above-described control unit 50 is composed of a total drive torque output section 51 for outputting an estimated total drive torque TrD, a basic distribution torque output section 52 for outputting a basic distribution torque TrB, a PID control amount output section 53 for outputting a PID control amount CX, a subtraction section 54 for subtracting the basic distribution torque TrB from the estimated total drive torque TrD, a multiplication section 55 for multiplying a residual drive torque $\Delta$Tr output from the subtraction section 54 by the PID control amount CX, an addition section 56 for adding an LSD torque Tr1 output from the multiplication section 55 to the basic distribution torque TrB, and a torque limit section 57 for outputting a smaller one of an addition drive torque $\Sigma$Tr output from the addition section 56 and a maximum distribution torque TrM.

The basic distribution torque TrB is a drive torque distributed to the rear wheels Wr1, Wr2 as a default value (namely, initial value), for example, when a differential rotation occurs between the front wheels Wf1, Wf2 and the rear wheels Wr1, Wr2. Therefore, the basic distribution torque TrB is preferably a torque value that is higher than or equivalent to a minimum rated torque required to start the vehicle 1.

The estimated total drive torque TrD is a total drive torque of the whole four wheels presumably required for the stable running of the vehicle 1. Therefore, the estimated total drive toque TrD is calculated based on all or part of an accelerator pedal opening APD, a brake BRK, a shift position, a steering angle, a front and rear wheel rotation speed VWf1, VWf2, VWr1, VWr2 and a clutch differential rotation ΔN.

The PID control amount CX is a total value of an appropriate combination of a proportional gain (namely, P term gain), an integral gain (namely, I term gain) and a differential gain (namely, D term gain) determined depending on the clutch differential rotation ΔN. Therefore, when the front wheels Wf1, Wf2 are judged to be stuck in the idling state, the control unit 50 raises the current command rear torque TrCMD step by step by operating the PID control amount RX and raising the LSD torque Tr1.

The torque limit section 57 selects and outputs a smaller one of an addition drive torque ΣTr (=Tr1+TrB) and a preset maximum distribution torque TrM. Namely, when the addition drive torque ΣTr exceeds the maximum distribution torque TrM, an excess beyond the maximum distribution torque TrM is eliminated by the torque limit section 57. Thus, the command rear torque TrCMD can be always suppressed to less than or equal to the maximum distribution torque TrM. It should be noted that the maximum distribution torque TrM is derived by multiplying the estimated total drive torque TrD by a predetermined distribution ratio.

And, in the drive torque control device for the four-wheel-drive vehicle 1 of this embodiment, vehicle 1 is judged to be stuck at stop in the state in which the front wheels Wf1, Wf2 are idling when the differential rotation ΔN of the clutch 10 continues for a first threshold time T1 in the state in which the rear wheels Wr1, Wr2 are at stop, thereby performing control to immediately raise the rear torque command value for the clutch 10 step by step. This control will be described in detail below.

Figure 3:
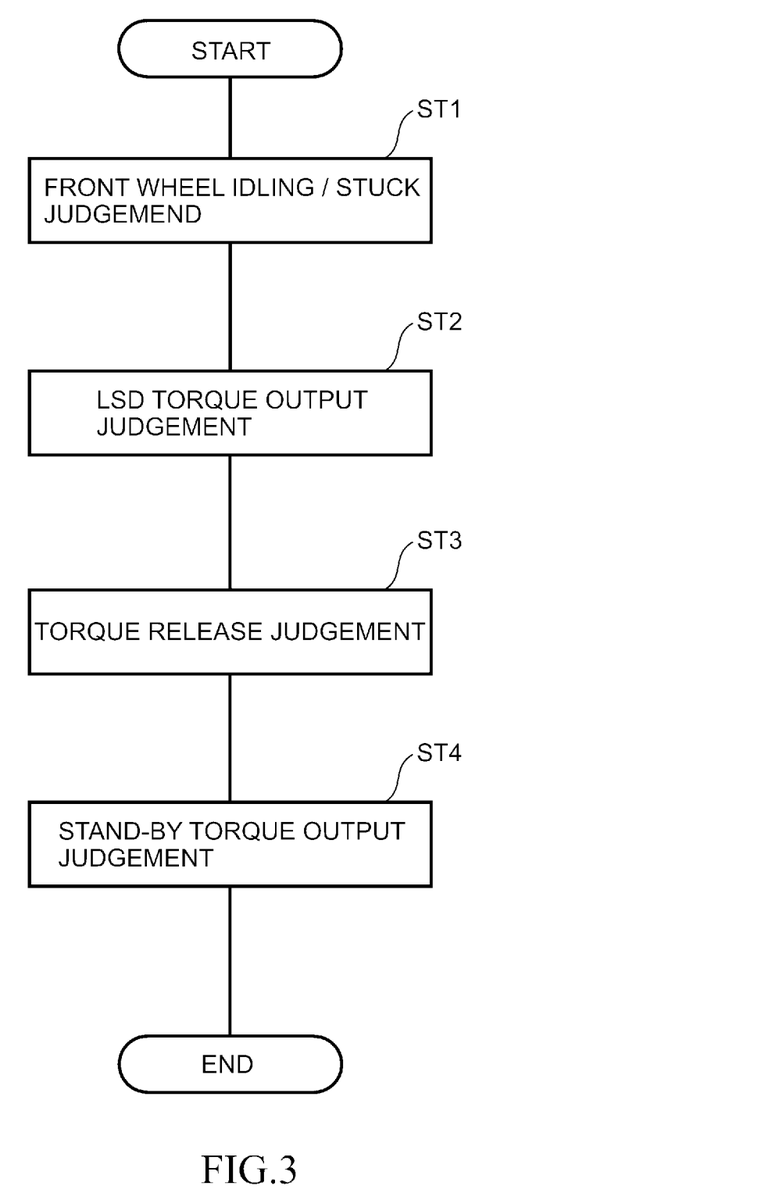
FIG. 3 is a flow chart for describing a flow of a rear torque command by a control unit under a road surface condition that a vehicle is stuck with front wheels being in an idling state.

FIG. 3 is a flow chart illustrating a flow of contents of the rear torque command by the control unit 50 under a road surface condition that the vehicle is stuck with the front wheel Wf1, Wf2 being idling.

In step ST1 of FIG. 3, it is judged whether the vehicle 1 is stuck in the idling state of the front wheels Wf1, Wf2. If the clutch differential rotation ΔN is greater than or equal to a predetermined rotation N1 (ΔN>=N1), the rear wheels Wr1, Wr2 are at stop, and these states continue to be at stop for the first threshold time T1, which are judgment criteria here, the vehicle 1 is judged to be stuck in the idling state of the front wheels Wf1, Wf2. In addition, the step ST1 corresponds to a shift of 0 to 1 (0→1) at time t2 of a front wheel idling/stuck judgment flag, which will be described in FIG. 4C below.

It should be noted that the clutch differential rotation ΔN here refers to a rotation speed difference between an input rotation speed of the clutch 10 and an output rotation speed of the clutch 10. The clutch differential rotation ΔN also refers to a difference between a rotation speed of the propeller shaft 7 of the front side of the clutch 10 (namely, engine 3 side) and a rotation speed of the propeller shaft 7 of the rear side (namely, rear diff 19 side) of the clutch 10.

In step ST2, it is judged whether to output the LSD torque Tr1. The control unit 50 raises the command rear torque TrCMD step by step as soon as the vehicle is judged to be stuck in the idling state of the front wheels Wf1, Wf2. And, the control unit 50 continues outputting the command rear torque TrCMD as the LSD torque Tr1. It should be note that the step ST2 corresponds to a stepwise rise in the command rear torque to shift to Tr1 at time t2 and time t4, as will be described in FIG. 4F below. And, "stepwise" here (or "step by step" elsewhere) refers to the increase in the command rear torque TrCMD up to Tr1 at time t2 instantly (namely, momentarily). The same applies hereafter.

In step ST3, it is judged whether to release the command rear torque TrCMD. The control unit 50 forcibly releases the current command rear torque TrCMD if the brake is in operation and all of the four-wheels are at stop (hereinafter referred to as "forced four-wheel stop state"). In other words, the torque of the clutch 10 is reduced forcibly to zero. It should be that this step ST3 corresponds to the release of the command rear torque to shift to 0 at time t3, t5 and t8, as will be described in FIG. 4F below.

In step ST4, it is judged whether to output the stand-by torque Tr2. If the forced four-wheel stop state continues for a second threshold time T2, the control unit 50 immediately raises the current command rear torque TrCMD step by step. And, the control unit 50 continues outputting the command rear torque TrCMD as the stand-by torque Tr2. It should be noted that this step ST4 corresponds to the stepwise rise in the command rear torque to shift to Tr2 at time t6 and t9, as will be described in FIG. 4F below.

FIG. 4 is a time chart illustrating a temporal change in the rear torque command by the control unit 50 under the road surface condition that the vehicle 1 is stuck in the idling state of the front wheels Wf1, Wf2. The horizontal axes refer to a common time period. Each vertical axis indicates, from the top in order, an accelerator pedal opening AP/brake BRK (FIG. 4A), front and rear wheel speeds VWf1, VWf2, VWr1, VWr2 (FIG. 4B), a front wheel idle/stuck judgment flag (FIG. 4C), a torque release judgment flag (FIG. 4D), a stand-by torque judgment flag (FIG. 4E), and a command rear torque TrCMD (FIG. 4F).

Figure 4A:
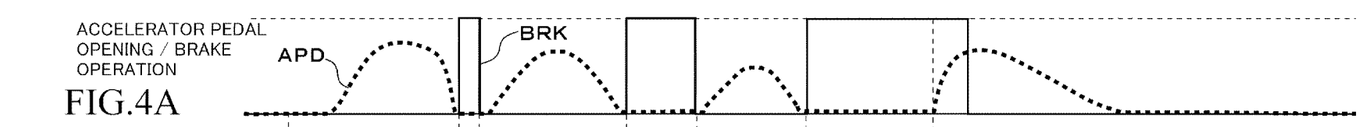
FIGS. 4A to 4F depict a time chart showing temporal changes in a rear torque command under a road surface condition that a vehicle is stuck with front wheels being in an idling state.

As shown in FIG. 4A, at time t1, the front wheels Wf1, Wf2 begin turning in the state in which the rear wheels Wr1, Wr2 are at stop. And, as shown in FIG. 4F, the command rear torque TrCMD begins increasing depending on a differential rotation between the front and rear wheels (namely, clutch differential rotation ΔN).

At time t2 (=t1+T1), in the state in which the rear wheels Wr1, Wr2 are at stop, the first threshold time T1 has passed after the front wheels Wf1, Wf2 had begun turning. As a result, as shown in FIG. 4C, the front wheel idling/stuck judgment flag shifts from "0" to "1", and as shown in FIG. 4F, the command rear torque TrCMD is raised to Tr1 step by step. Then, the command rear torque TrCMD is output as the LSD torque Tr1.

As shown in FIG. 4A, at time t3, the brake BRK is turned ON. In this case, the front wheel idling/stuck judgment flag is "1", and all of the four wheels are at stop. And, as shown in FIG. 4D, the torque release judgment flag becomes "1", and accordingly, as shown in FIG. 4F, the command rear torque TrCMD becomes zero step by step. In other words, the drive torque (namely, hydraulic pressure) is released in the clutch 10.

At time t4, the brake BRK is turned OFF, and as shown in FIG. 4D, the torque release judgment flag becomes "0". At this time, the second threshold time T2 has not passed since the release of the drive torque at time t3. Therefore, as shown in FIG. 4F, the command rear torque TrCMD is raised to Tr1 step by step and then output as the LSD torque Tr1.

At time t5, as shown in FIG. 4A, the brake BRK is turned ON, and the torque release judgment flag shifts from "0" to "1". In this case, as is at time t3, the front wheel idling/stuck judgment flag is "1", and all of the four wheels are at stop. Due to this, the command rear torque TrCMD becomes zero step by step, and the drive torque (hydraulic pressure) of the clutch 10 is released in the clutch 10.

At time t6 (=t5+T2), the second threshold time T2 has passed after the release of the drive torque at time t5. Thus, as shown in FIG. 4E, the stand-by torque judgment flag shifts from "0" to "1". Accordingly, the command rear torque TrCMD is raised to Tr2 (<Tr1) step by step. And, the command rear torque TrCMD continues to be output as the stand-by torque Tr2. It should be noted that in the stand-by torque state, a clutch differential rotation ΔN has occurred after engaging the clutch 10 at a predetermined torque.

Figure 4B:
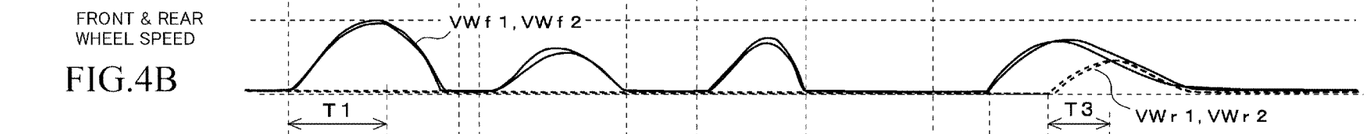
Figure 4C:
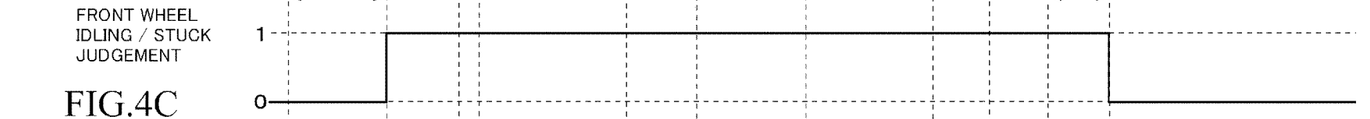
Figure 4D:
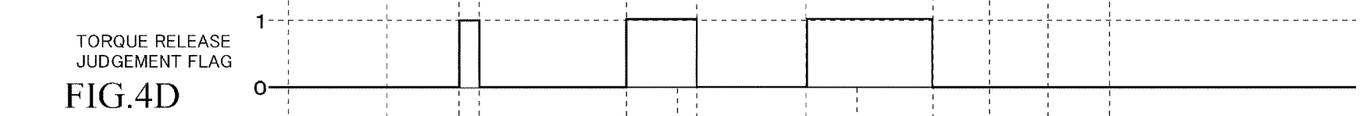
Figures 4E, 4F:
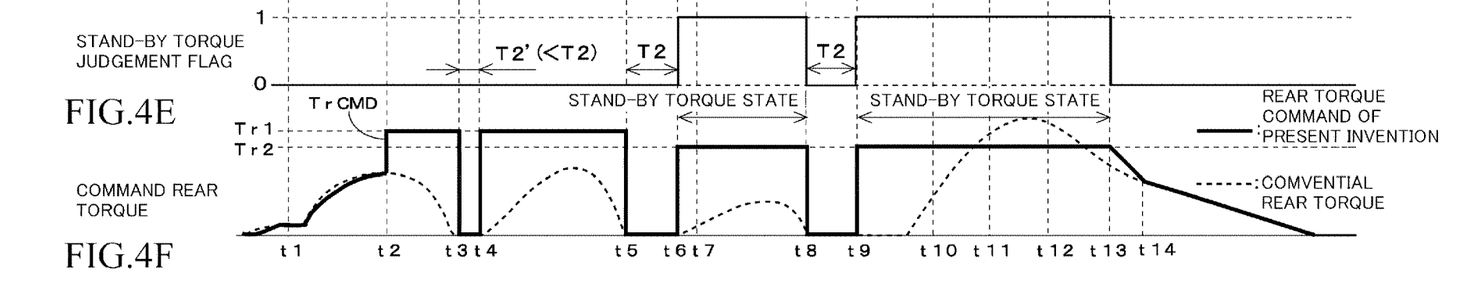

At time t7, as shown in FIGS. 4A and 4B, the brake BRK turns OFF, the accelerator pedal begins opening, and the drive torque from the engine 3 begins to be transmitted to the clutch 10. Accordingly, the torque release judgment flag shifts from "1" to "0" as shown in FIG. 4D.

At time t8, as shown in FIGS. 4A and 4B, the brake BRK turns ON and the accelerator pedal closes. In this case, the front wheel idling/stuck judgment flag is "1", and all of the four wheels are at stop. And, as shown in FIG. 4D, the torque release judgment flag shifts from "0" to "1". At the same time, the stand-by torque judgment flag shifts from "1" to "0". Accordingly, as shown in FIG. 4F, the command rear torque TrCMD becomes zero step by step, and the drive torque (hydraulic pressure) of the clutch 10 is released.

At time t9 (=t8+T2), the second threshold time T2 has passed since the drive torque had been released at time t8. In this case, as shown in FIG. 4E, the stand-by torque judgment flag shifts from "0" to "1". Due to this, as shown in FIG. 4F, the command rear torque TrCMD is raised to Tr2 step by step so as to again form the stand-by torque.

At time t10, as shown in FIG. 4A, the accelerator pedal begins opening and the torque from the engine 3 begins to be transmitted to the clutch 10. In this case, as shown in FIG. 4D, the torque release judgment flag shifts from "1" to "0".

At time t11, the rotation speed VWf1, VWf2 of the front wheels rises from zero. Following this, at time t12, the rotation speed VWr1, VWr2 of the rear wheels rises from zero.

Figure 5:
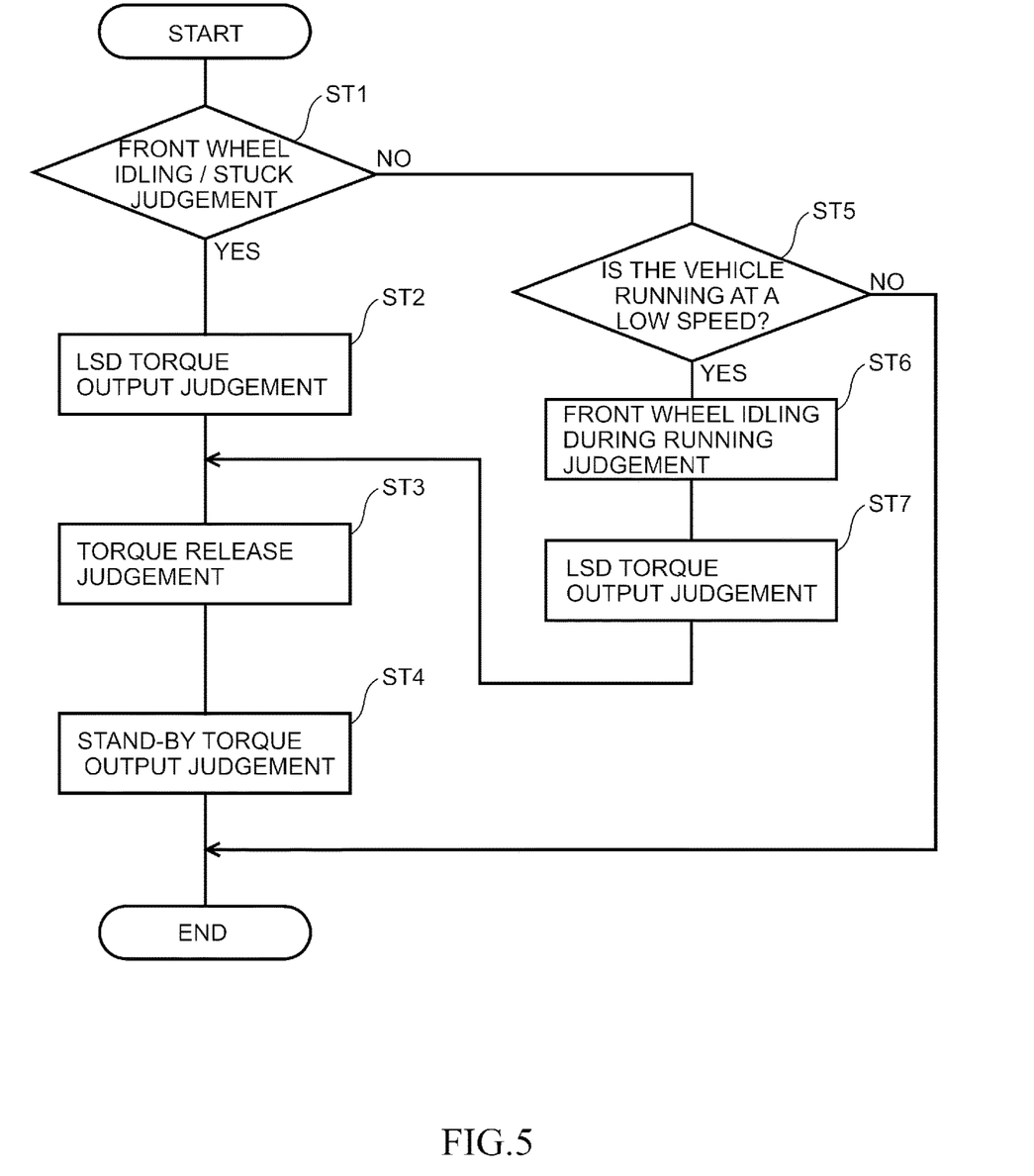
FIG. 5 is another flow chart for illustrating a flow of a rear torque command by a control unit under a road surface condition that a vehicle is stuck with front wheels being in an idling state.

At time t13 (=t12+T3), the third threshold time T3 has passed since the rear wheels Wr1, Wr2 had begun rotating, whereby as shown in FIG. 4C, the front wheel idling/stuck judgment flag shifts form "1" to "0". In addition, as shown in FIG. 4E, the stand-by torque judgment flag shifts from "1" to "0". Thus, the control unit 50 begins returning the rear torque command for the clutch 10 to a normative rear torque command. It should be noted that as indicated by the dotted line in FIG. 4F, the normative rear torque command refers to the state of no stepwise rear torque command, for example, at time t2 and t6 in FIG. 4, such as the rear torque command (namely, basic distribution torque+LSD torque) as shown in FIG. 5.

After time t14 onward, the control unit 50 performs the normative rear torque command.

As described above, the control unit 50 of the present invention raises the command rear torque TrCMD step by step as soon as the vehicle is judged to be stuck in the idling state of the front wheels Wf1, Wf2, which are the driving wheels. And, as soon as the brake BRK operates and all of the four wheels stop in the state in which the front wheel idling/stuck judgment flag is "1", the command rear torque TrCMD is reduced to zero step by step so as to release the drive torque (namely, clutch engagement pressure) of the clutch 10. And, as soon as the second threshold time T2 passes after the release of the drive torque, the command rear torque TrCMD is raised step by step so as to form the stand-by torque state. By forming the stand-by torque state, an actual torque larger than or equal to a minimum rated torque required to start the vehicle 1 can be transmitted to the rear wheels Wr1, Wr2. This enables the vehicle 1 to escape from the running condition of being stuck in the idling state of the front wheels Wf1, Wf2.

Furthermore, the dependence of the command rear torque TrCMD in accordance with the present invention on the estimated total drive torque is small on the whole. As a result, under the road surface condition that the front wheels Wf1, Wf2 are stuck in the idling state, no command rear torque TrCMD is estimated to be low (namely, a low command rear torque TrCMD is not output). In addition, the command rear torque TrCMD rises fast. This can instantly raise the current command rear torque TrCMD step by step, so as to in the LSD torque state or the stand-by torque state, transmit a minimum rated torque required to start the vehicle 1 to the rear wheels Wr1, Wr2.

Moreover, the first rise in the command rear torque TrCMD shortens the engagement time. Accordingly, no output reduction in the transmission torque occurs due to the heating of the clutch 10.

Therefore, according to the present invention, in the drive torque distributor for the four-wheel-drive vehicle that controls the clutch 10 for front and rear torque distribution so as to change the torque distributed to the rear wheels Wr1, Wr2, which are the auxiliary driving wheels, when the front wheels Wf1, Wf2, which are the main driving wheels, are stuck in the idling state, the actual torque higher than or equivalent to the minimum rated torque required to start the vehicle can be instantly transmitted to the rear wheel Wr1, Wr2, which are the auxiliary driving wheels. In this manner, under the road surface condition that the main driving wheels Wf1, Wf2 are stuck in the idling state or under the road surface condition equivalent thereto, the running performance of the vehicle can be improved.

Second Embodiment

Next, a second embodiment of the present invention is described. In the description of the second embodiment and the corresponding drawings, component parts that are identical or equivalent to those of the first embodiment are denoted by the same symbols, and any detailed description of those parts is omitted. And features other than those described as below are the same as in the first embodiment.

In the first embodiment, on one hand, the control to instantly raise the command rear torque TrCMD step by step is performed in the state in which the vehicle is stuck (namely, vehicles are at stop) in the idling state of the front wheels. In the control of the present embodiment, on the other hand, if the front wheels Wf1, Wf2 fall in the idling state while the vehicle is running (at a low speed), the command rear torque TrCMD is gradually (so-called in a sweep shape) raised so as to gradually increase with respect to the elapsed time from the time when the front wheels Wf1, Wf2 fall in the idling state.

FIG. 5 is a flow chart for illustrating a flow of the rear torque command by the control unit under the road surface condition that the front wheels Wf1, Wf2 are in the idling state when the vehicle is running (at a low speed). It should be noted that steps ST1 to ST4 in FIG. 5 are the same as steps ST1 to ST4 shown in FIG. 3 of the first embodiment.

If the front wheels are judged to be in the idling/stuck state (YES) in step ST1 of FIG. 5, then the flow proceeds to Step 2. On the other hand, if the front wheels are judged not to be in the idling/stuck state (NO), then the flow proceeds to Step 5 so as to judge whether the vehicle is running at a low speed. "Running at a low speed" here applies to the case that the vehicle can be judged to be not at stop (namely, be running at any speed other than 0) but running at a vehicle speed lower than or equal to a predetermined speed. This can be judged in light of the fact that the rear wheels (auxiliary driving wheels) Wr1, Wr2 are rotating at a rotation speed less than or equivalent to a predetermined threshold (namely, at any speed other than 0). Alternatively, for example, this can be so judged from any vehicle speed data detected by a vehicle speed sensor.

As a result, on one hand, if the vehicle is judged not to be running at a low speed (NO), the operation is terminated as it is. On the other hand, if the vehicle is judged to be running at a low speed (YES), the operation proceeds to a front wheel idling during running judgment (step ST6). In this front wheel idling during running judgment in step ST6, it is judged whether the front wheels Wf1, Wf2 are idling in the state in which the vehicle is running (at a low speed). In this case, if the rear wheels Wr1, Wr2 are not at stop (namely, the rotation speed of the rear wheels Wr1, Wr2 is other than 0) and the clutch differential rotation $\Delta N$ is greater than or equal to a predetermined rotation N2 ($\Delta N>=N2$), and these states continue for the first threshold time T1, which are judgment criteria here, the front wheels Wf1, Wf2 are judged to be idling while the vehicle 1 is running. It should be noted that this step ST6 corresponds to shift of 0 to 1 (0→*1) of the front wheel idling during running judgment flag at time t2 in FIG. 6C, which will be described below. Then, the operation proceeds to step ST7.

In step ST7, the LSD torque Tr1 is output. Namely, upon judgement that the front wheels Wf1, Wf2 are idling while the vehicle is running (namely, the front wheel idling during running judgment flag shifts from 0 to 1), the control unit 50 (gradually) raises the command rear torque TrCMD as the LSD torque Tr1 so as to gradually increase according to an elapsed time from this judgement. And, the control unit 50 continues outputting the command rear torque TrCMD as the LSD torque Tr1. It should be noted that this step ST7 corresponds to a gradual rise in the command rear torque to shift to Tr1 depending on elapsed time from time t2 of FIG. 6F, which will be described below. Then, the operation proceeds to step ST3.

In step ST3, it is judged whether to release the command rear torque TrCMD. As the contents of the control of this step ST3 are the same as those of the control in step ST3 of FIG. 3 in the first embodiment, any detailed description is omitted here.

In step ST4, it is judged whether to output the stand-by torque Tr2. As the contents of the control of this step ST4 are the same as those of the control in step ST4 of FIG. 3 in the first embodiment, any detailed description is omitted here.

FIG. 6 is a time chart illustrating a temporal change in the rear torque command by the control unit 50 under the road surface condition the front wheels Wf1, Wf2 are in the idling state when the vehicle is running. The horizontal axes refer to a common time period. The vertical axes are the same as those of FIG. 4 of the first embodiment except that the vertical axis of FIG. 6C indicates the front wheel idling during running judgment flag.

Figure 6A:
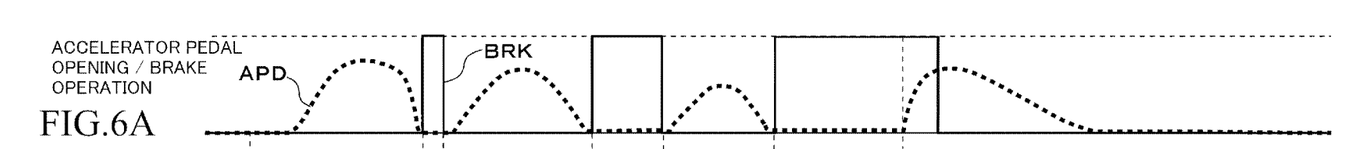
FIGS. 6A to 6F depict a time chart illustrating temporal changes in a rear torque command under a road surface condition that a vehicle is stuck with front wheels being in an idling state.
Figures 6B, 6C:
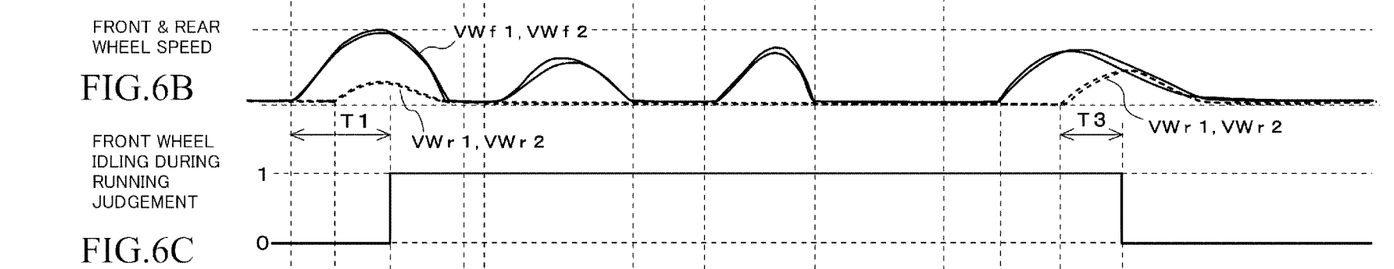
Figure 6D:
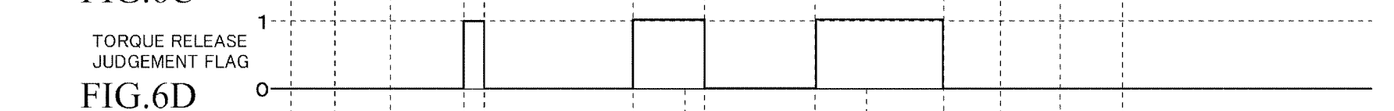
Figures 6E, 6F:
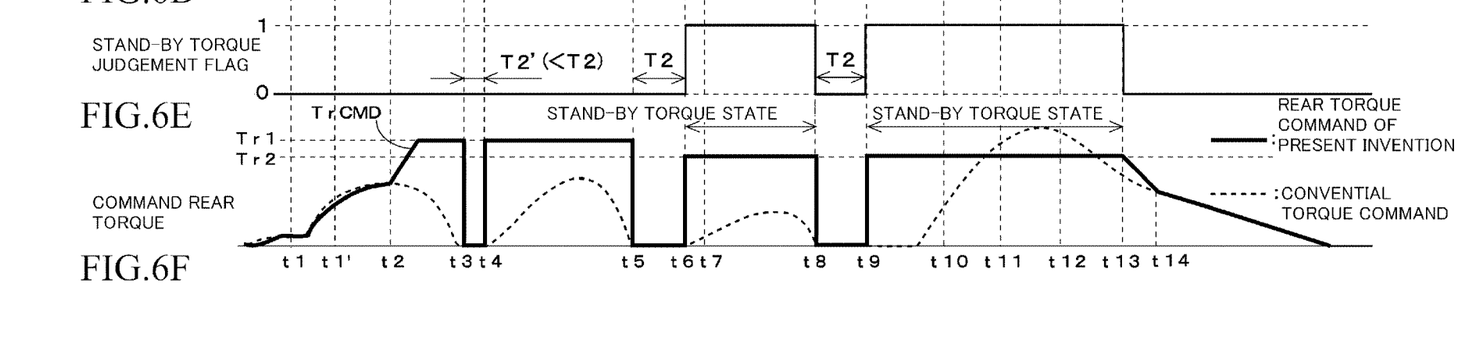

As shown in FIG. 6A, at time t1, the front wheels Wf1, Wf2 begin rotating in the state in which the rear wheels Wr1, Wr2 are at stop. In addition, as shown in FIG. 6F, the command rear torque TrCMD begins increasing depending on a differential rotation (clutch differential rotation $\Delta N$) between the front and rear wheels. Then, the rear wheels Wr1, Wr2 start rotating at time t1'. Thereafter, the rear wheels Wr1, Wr2 rotate at a relatively low speed (namely, at a largely lower speed than the front wheels Wf1, Wf2).

Thereafter, at time t2 (=t1+T1), the first threshold time T1 has passed since the front wheels Wf1, Wf2 began rotating. As a result, as shown in FIG. 6C, the front wheel idling during running judgment flag shifts from "0" to "1", and as shown in FIG. 6F, the command rear torque TrCMD is raised so as to gradually increase according to elapsed time from time t2. And, the said command rear torque TrCMD is output as the LSD torque Tr1. It should be noted that in the change in the command rear torque TrCMD showing in FIG. 6, the command rear torque TrCMD is raised so that the said command rear torque TrCMD increases in proportion to elapsed time from time t2.

As changes in each value after time t3 are the same as those shown in FIG. of the first embodiment, any detailed descriptions thereof are omitted here.

As described above, upon judgement that the front wheels Wf1, Wf2 are idling while the vehicle is running at a relatively low speed, the control unit 50 gradually raises the command rear torque TrCMD so as to gradually increase according to elapsed time from this judgement. Thus, by gradually (step by step) transmitting a non-excessive torque (relatively small torque) to the rear driving wheels Wr1, Wr2 if the front wheels Wf1, Wf2 are in the idling state when the vehicle is running at a low speed, the front and rear torque distribution clutch 10 is smoothly engaged so as to dissolve the idling state of the front driving wheels Wf1, Wf2. This enables the front driving wheels Wf1, Wf2 to return from the idling state without no unstable behavior of the running vehicle.

In other words, if a maximum or nearly maximum torque is suddenly transmitted to the rear wheels Wr1, Wr2 when the front wheels Wf1, Wf2 are idling in the state in which the vehicle is running, for example, on a snow-covered uphill road (at a low speed), the vehicle might behave unstably. Because of this, in that case, a gradual increase in the torque transmitted to the rear wheels Wr1, Wr2 can secure the stability of behaviors of the vehicle.

While embodiments of the present invention have been described above, the present invention is not limited to the above-mentioned embodiments, but various modifications are possible within the scope of the technical idea as defined in the claims, the specification, and the drawings. For example, the above-described second embodiment describes the case that if the front wheels Wf1, Wf2 fall into the idling state while the vehicle is running (at a low speed), the command rear torque TrCMD is raised in proportion to the elapsed time from the time when the front wheels Wf1, Wf2 fall in the idling state. However, the control of the present invention may be performed so that the command rear torque TrCMD be raised not only proportionally but also in other embodiments as far as it is raised gradually with respect to the elapsed time.

The invention claimed is:

1. A torque control device for a four-wheel-drive vehicle, the torque control device comprising:
    main driving wheels to which a drive torque from a drive source of the vehicle is always transmitted;
    auxiliary driving wheels to which the drive torque is transmitted as needed;
    a drive torque transmission path for transmitting the drive torque to the auxiliary wheels;
    a clutch connecting/disconnecting the drive torque transmission path; and
    a processor controlling a distribution drive torque distributed to the auxiliary wheels by controlling the clutch,
    wherein the processor comprises a command torque output section outputting a command distribution drive torque that is a command value of the distribution drive torque,
    wherein the processor performs control to raise a current command distribution drive torque for the clutch if a differential rotation of the clutch continues for a predetermined first time in a state in which the auxiliary driving wheels are not at stop, and wherein the processor raises the command distribution drive torque so as to increase according to elapsed time.

2. The torque control device for the four-wheel-drive vehicle according to claim 1, wherein the processor performs control to release the command distribution drive torque when a brake braking rotations of the main driving wheels and the auxiliary driving wheels operates and the main driving wheels and the auxiliary wheels stop after raising the command distribution drive torque.

3. The torque control device for the four-wheel-drive vehicle according to claim 1, wherein the processor raises the command distribution drive torque in proportion to elapsed time.

4. The torque control device for the four-wheel-drive vehicle according to claim 3, wherein the processor immediately raises the command distribution drive torque if a differential rotation of the clutch continues for the first time in a state in which the auxiliary driving wheels are at stop.

5. The torque control device for the four-wheel-drive vehicle according to claim 3, wherein the processor performs control to release the command distribution drive torque when a brake braking rotations of the main driving wheels and the auxiliary driving wheels operates and the main driving wheels and the auxiliary wheels stop after raising the command distribution drive torque.

6. The torque control device for the four-wheel-drive vehicle according to claim 1, wherein the processor immediately raises the command distribution drive torque if a differential rotation of the clutch continues for the first time in a state in which the auxiliary driving wheels are at stop.

7. The torque control device for the four-wheel-drive vehicle according to claim 6, wherein the processor performs control to release the command distribution drive torque when a brake braking rotations of the main driving wheels and the auxiliary driving wheels operates and the main driving wheels and the auxiliary wheels stop after raising the command distribution drive torque.

8. A torque control device for a four-wheel-drive vehicle, the torque control device comprising:

main driving wheels to which a drive torque from a drive source of the vehicle is always transmitted;

auxiliary driving wheels to which the drive torque is transmitted as needed;

a drive torque transmission path for transmitting the drive torque to the auxiliary wheels;

a clutch connecting/disconnecting the drive torque transmission path; and a processor controlling a distribution drive torque distributed to the auxiliary wheels by controlling the clutch, wherein the processor comprises a command torque output section outputting a command distribution drive torque that is a command value of the distribution drive torque, wherein the processor performs control to raise a current command distribution drive torque for the clutch if a differential rotation of the clutch continues for a predetermined first time in a state in which the auxiliary driving wheels are not at stop, and wherein the processor performs control to release the command distribution drive torque when a brake braking rotations of the main driving wheels and the auxiliary driving wheels operates and the main driving wheels and the auxiliary wheels stop after raising the command distribution drive torque.

9. The torque control device for the four-wheel-drive vehicle according to claim 8, wherein the processor performs control to raise the command distribution drive torque immediately when a predetermined second time has passed after releasing the command distribution drive torque.

* * * * *